(12) United States Patent
Rosenthal

(10) Patent No.: US 7,724,438 B2
(45) Date of Patent: May 25, 2010

(54) LENTICULAR OPTICAL SYSTEM

(76) Inventor: Bruce A. Rosenthal, 6 Bulaire Rd., East Rockaway, NY (US) 11518

( * ) Notice: Subject to any disclaimer, the term of this patent is extended or adjusted under 35 U.S.C. 154(b) by 61 days.

(21) Appl. No.: 11/256,489

(22) Filed: Oct. 22, 2005

(65) Prior Publication Data

US 2006/0056033 A1    Mar. 16, 2006

Related U.S. Application Data

(63) Continuation of application No. 10/677,589, filed on Oct. 2, 2003, now Pat. No. 6,989,931, which is a continuation of application No. 09/363,988, filed on Jul. 22, 1998, now Pat. No. 6,751,024.

(51) Int. Cl.
*G02B 27/10*   (2006.01)
(52) U.S. Cl. ............... 359/619; 359/621; 359/622
(58) Field of Classification Search ......... 359/619, 359/620, 625, 628, 621, 623
See application file for complete search history.

(56) References Cited

U.S. PATENT DOCUMENTS

| | | | | |
|---|---|---|---|---|
| 2,562,077 A | * | 7/1951 | Winnek | 355/22 |
| 5,494,445 A | * | 2/1996 | Sekiguchi et al. | 434/365 |
| 5,642,226 A | | 6/1997 | Rosenthal | |
| 5,644,431 A | * | 7/1997 | Magee | 359/619 |
| 6,084,713 A | | 7/2000 | Rosenthal | |
| 6,256,150 B1 | | 7/2001 | Rosenthal | |
| 6,414,794 B1 | | 7/2002 | Rosenthal | |
| 6,490,093 B2 | * | 12/2002 | Guest | 359/619 |
| 6,751,024 B1 | | 6/2004 | Rosenthal | |
| 2004/0051952 A1 | * | 3/2004 | Raymond | 359/619 |

* cited by examiner

*Primary Examiner*—Ricky L. Mack
*Assistant Examiner*—Brandi N Thomas

(57) ABSTRACT

A lenticular optical system is described in which a composite image is viewable through a lens sheet from a first angle and an object or image placed at a preselected distance beneath the composite image is viewable from a second angle. Optical designs and alignment processes are disclosed which make possible the economical production of thin materials which facilitate the manufacturing and utilization of the optical system in packaging and the like.

3 Claims, 15 Drawing Sheets

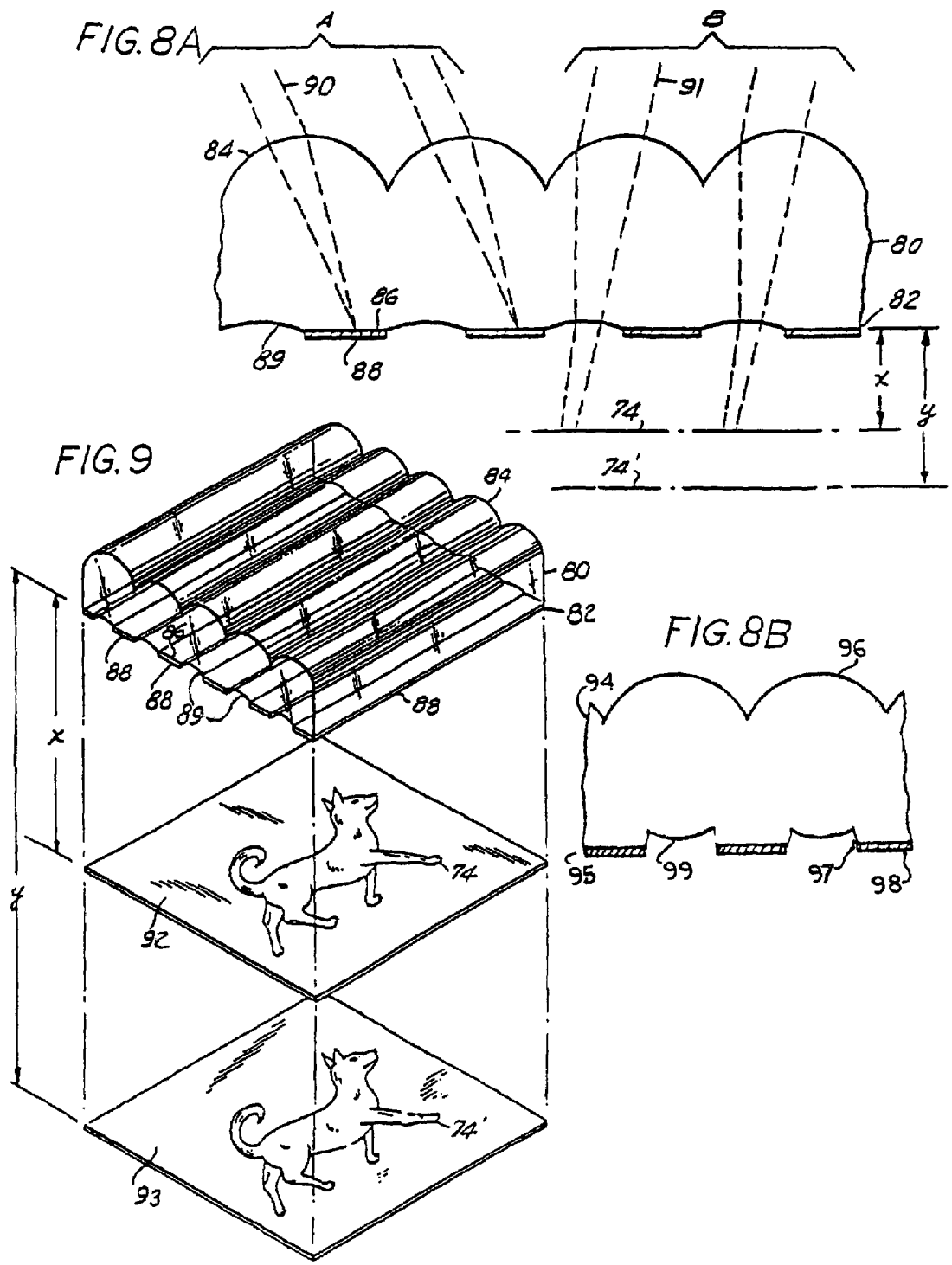

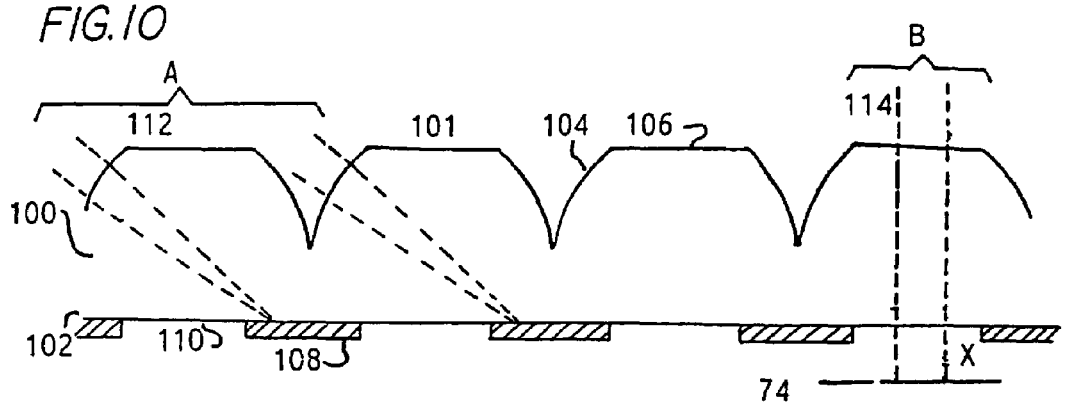
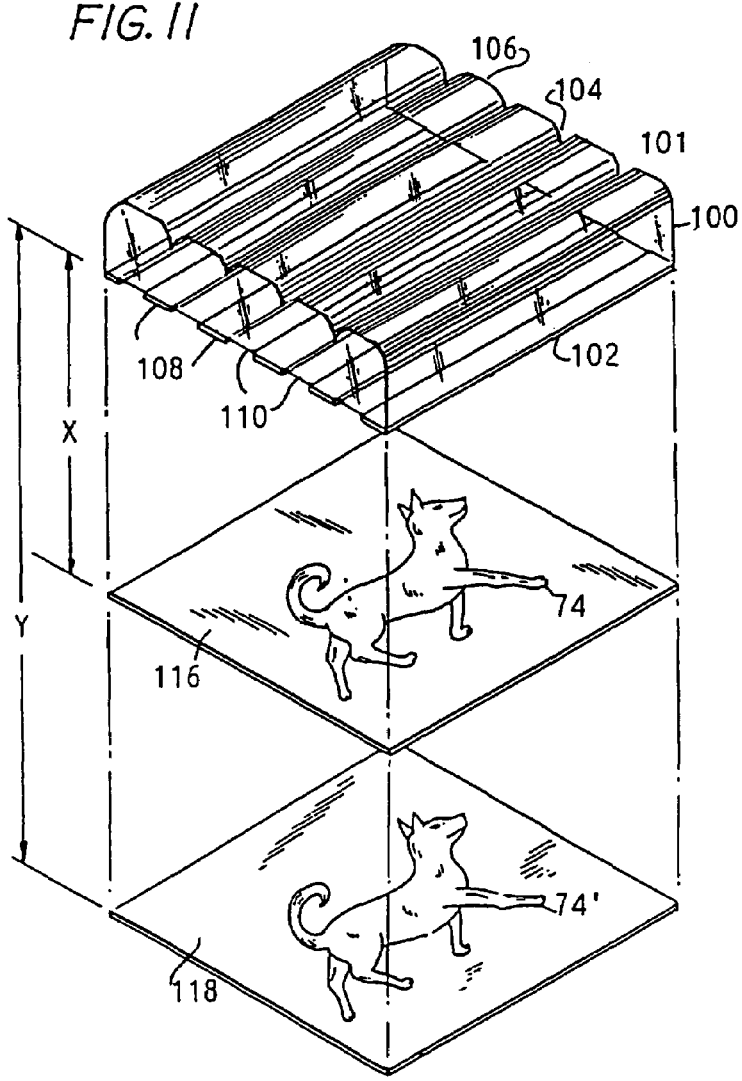

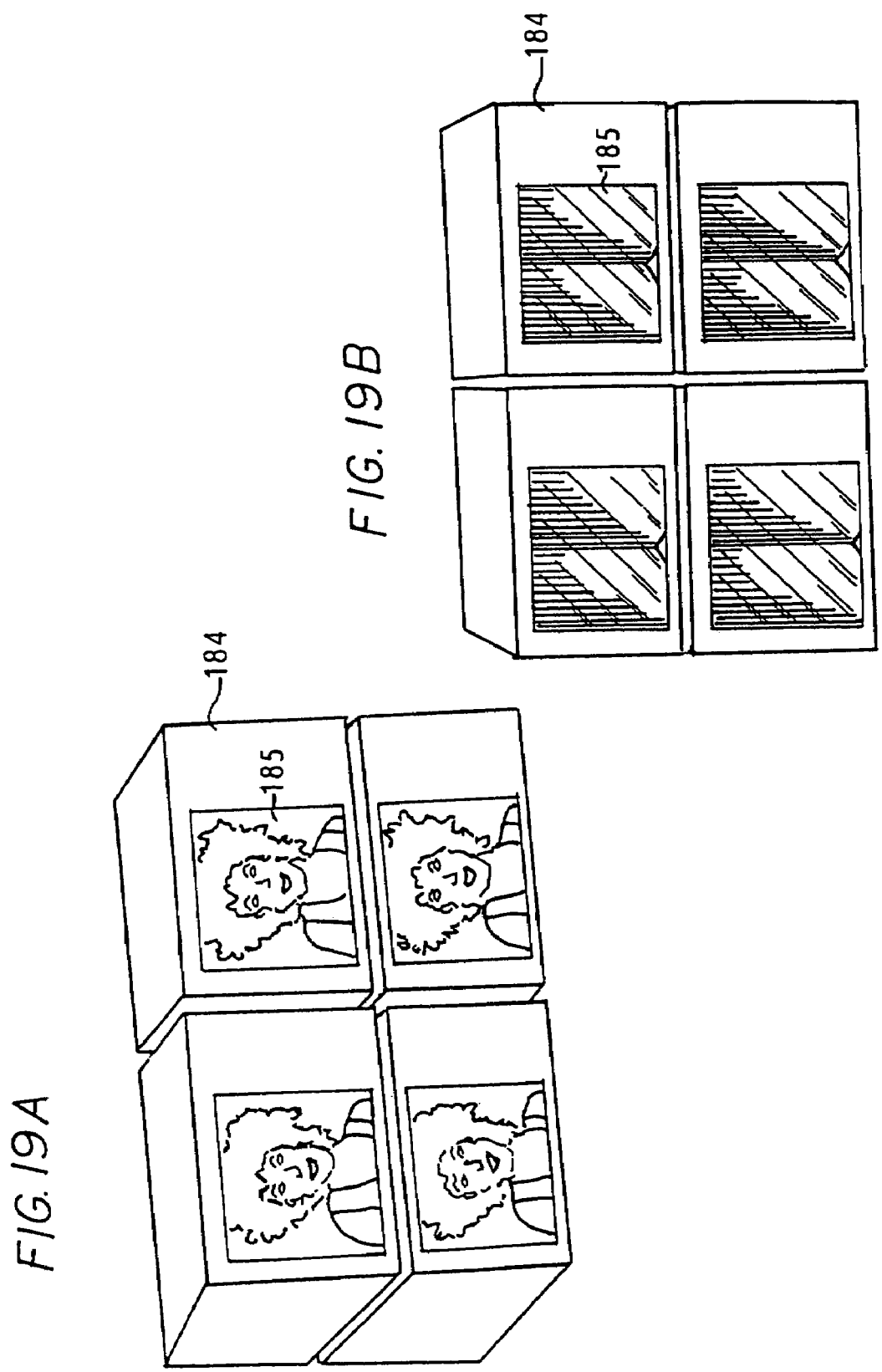

LENTICULAR OPTICAL SYSTEM

CROSS REFERENCE TO RELATED APPLICATIONS

This is a continuation of U.S. application Ser. No. 10/677,589 filed Oct. 2, 2003 now U.S. Pat. No. 6,989,931 which is a continuation of U.S. application Ser. No. 09/363,988 filed Jul. 22, 1998 now U.S. Pat. No. 6,751,024 which claims priority under 35 USC Sec. 120 of U.S. patent application Ser. No. 08/375,405, filed Jan. 18, 1995, now issued as U.S. Pat. No. 5,642,226, issued Jun. 24, 1997, and also claims priority under 35 USC Sec. 305 of PCT/IB/96/00224, filed Jan. 17, 1996, all of which are incorporated herein by reference. The international application, under PCT article 21(2), was published in English.

This invention relates generally to optical systems and more particularly to a lenticular optical system through which various composite images can be viewed.

Lenticular lenses are well known for use in optical systems to produce various types of unique optical effects. The known lenticular lens systems generally include a transparent sheet having a plane surface on one side thereof and on the other side, a series of parallel longitudinal ridges creating a multi-lenticular system of convex lenses. A print sheet or medium is generally disposed at the back of the lens adjacent to or on the plain surface. The print sheet contains at least two alternate series of spaced image lines, each series of image lines constituting a dissection or breakup of a master picture. The two series of image lines are so optically related with respect to the lens elements as to be alternately visible upon positional changes of the viewer with respect to the lenses. When viewed from one position, the first series of image lines are visible so as to display the first composite picture. When viewed from a second position, the second series of line are visible so as to display the second composite picture.

The same lenticular system can also be utilized to produce a three-dimensional picture effect. In forming such effects, the two images respectively constitute a right eye view of an object and a left eye view of the same object in normal visual parallax. The lenticular lenses are placed to be along a line perpendicular to an imaginary line drawn through the two pupils of the eyes of the viewer. In this manner, the convex lenses provide the desired optical effect to divert light rays from the image lines making up the right eye elements of the picture into the right eye of the viewer and, in the same way, the left eye elements of the picture into left eye of the viewer, thereby creating the illusion of three-dimensional vision in the viewer's mind.

A major drawback of existing lenticular lens systems, such as those disclosed in my prior U.S. Pat. Nos. 4,541,727 and 4,034,555, is the fact that neither image can be placed at varying distances beneath the lens and be viewed successfully, nor is it possible to place a three-dimensional object beneath the lens sheet at varying distances and be viewed. Thus, the applications of existing lenticular lens systems are restricted. Such capability of placing an object or image beneath the first composite image would greatly expand the applications to which the system could be used.

Another drawback of existing lenticular lens systems is the fact that materials that are sufficiently thin enough for packaging and other large-scale commercial uses cannot be made using the most economical printing technologies. In traditional lenticular lens material, the thickness is the same dimension as the focal length, which is approximately three times the radius of curvature of the lens. With the limits of quality consistent mass printing, in the order of being able to print lenticular material in the order of 100 lenticules/inch, the lens material thickness is greater than 0.017 in. thick. In addition, where the object is to grab viewers' attention as they walk past, the traditional lens materials change too quickly for use as our two-phase system of image to see-through. The traditional materials change several times with too short a view of each phase. Another drawback of the known technique for fabricating lenticular lens is the inability to economically register the print lines to the lenses with the required critical parallel alignment.

A significant commercial use for materials with a dynamic change in views from an opaque picture view to a view of the interior contents is in packaging, and particularly the mass beverage and snack food packaging market. Surveys show that over 80 percent of consumers make their final purchasing decisions in the store. In beverage and snack food marketing, with a crowded field of products, it is essential to "catch the eye" of the consumer. There is a current need for an improved lenticular system in which a juxtaposition of advertising images and actual three-dimensional product within creates an enhanced visual attraction.

Lenticular optical system that create 3-D images and images which change with changes in viewing position have been produced for many years by printing pictures on sheets which are laminated to lenticular lens sheets. The lens sheets are injection molded, extruded, and embossed. The embossing has been typically done with a spiral engraving of the cylinder. This creates a skew of the emboss lines, which makes it extremely difficult to align the lenticular ridges parallel to the print lines. It is essential that the image lines be parallel to the ridges lines for 3-D and even more critical for image-to-see-through animation systems. This parallel relationship must be maintained in order to keep the 'see-through' slits open for a clear view of the objects beyond the plane of the lens sheet. If the lines and lens ridge are not mutually parallel, the image will not be capable of changing in a clear left-right, or up-down animation. Instead, the image would change in the form of diagonal bands diminishing in size with further misalignment of the parallel.

It is a general object of the present invention to provide an improved lenticular optical system and an improved process for fabricating such a system.

It is an object of the present invention to provide a lenticular optical system in which a composite image is viewable from one angle and an object or image placed at a selected distance between the composite image is viewable from a second angle.

It is a further object of the present invention to provide a lenticular optical system which provides a first composite image which can be viewed through lenticular lenses wherein the first composite image is formed of a plurality of spaced apart parallel strips with transparent stripes therebetween.

Still a further object of the present invention is to provide a lenticular optical system through which at least two composite pictures can be viewed and wherein an object will be viewed at a third angle.

Another object of the present invention is to provide a lenticular-type optical system which permits the placement of an object image at a plurality of preselected distances beneath a composite image for viewing at different angles.

Yet another object of the present invention is to provide an optical system in which one composite picture may be viewed from one angle and a three-dimensional object may be viewed from another angle.

Another object of the present invention is to provide a lenticular optical system which permits independent replacement of each composite image.

Another object of the invention is to provide optical systems which permit production of thin materials which are particularly useful for packaging.

Still another object of the present invention is to provide a multiple container packaging having an area having a lenticular lens system permitting the view of a first composite picture along one viewing direction and a second composite image, the actual individual containers within the outer package at another viewing angle.

Still another object of the present invention is to provide an array of packages with lenticular image to see-through portions which create a continuum of moving images.

Still another object of the present invention is to provide container labels having an area of lenticular lens system permitting view of two or more sets of information in a limited area, permitting the view of composite graphic information from certain directions of view and the contents of the containers from other viewing directions.

Another object of the present invention is to provide a process for fabricating a lenticular optical system in which the required accurate alignment for the quality control necessary for the economical printing of the large quantities needed for packaged goods and other commercial printing is achieved.

Another object of the invention is to overcome the limitations and disadvantages of prior lenticular optical systems.

According to one aspect of the concept of the present invention the novel means employed to overcome the limitations of the prior art include an optical lens system comprising a transparent sheet having a surface on one side of the sheet and its opposite second surface constituted by a plurality of parallel lenticular cylindrical lenses. The transparent sheet has a thickness in the range of between the dimension of the radius, and two times the radius. Herein it is a non-focusing lens, yet it functions adequately to view the light reflected and refracted from the two phases of the image stripe, and the clear stripe, the 'see-through' view. In addition, at the same time, it overcomes the limitation of the thicker traditional focusing lens which changes view of the phases too rapidly. The focusing lens can fill the lens with stripes in the order of $1/100$th of the image. In the present invention in the two phase image-to-see-through system, we wish to see approximately half the image area at one time. In addition, to enhance the 'see-through' view, the image stripes are printed thinner than the intervening clear 'window' stripes.

According to one aspect of the present invention, an optical system comprises a transparent sheet having a plane surface at one side of the sheet and its opposite surface is constituted by a plurality of parallel lenticular lenses. A first composite image is positioned with respect to the plane surface of the transparent sheet. The first composite image is formed of a plurality of spaced apart parallel strips with transparent strips therebetween. A second composite image can be positioned beneath the first composite image.

According to another aspect of the present invention, the optical system comprises a transparent sheet having a plane surface at one side of the sheet and its opposite surface constituted by a plurality of parallel lenticular-type lens ridges, each ridge including parallel convex lens and planer portions, the planar portions being disposed at a selected angle with respect to the plane surface. A composite image portion is positioned with respect to the plane surface of the transparent sheet. The composite image is formed of a plurality of spaced apart parallel strip portions forming intervening void portions which permit the passage of light therethrough from said planar portions. The composite image is viewable through the convex lens portions. An object image is positioned beneath and spaced at a preselected distance from said first surface, the object image being viewable in focus through the planar portions.

According to yet another aspect of the present invention, the optical lens system comprises a transparent sheet having a first surface at one side of the sheet and its opposite second surface constituted by a plurality of parallel lenticulated convex lenses. The first surface is constituted by a plurality of spaced apart parallel planar portions having a composite image positioned thereupon with transparent concave lens portions therebetween which permit the passage of light therethrough. The convex lenses and the concave lenses combine to form a combined lens of zero power of magnification. An object image, either planar or three-dimensional, is positioned beneath the sheet at a preselected distance, whereby the object image can be viewed through the transparent concave lens portions without distortion.

According to yet another aspect of the present invention, the optical lens system comprises a transparent sheet having a first surface at one side of the sheet and its opposite second surface constituted by a plurality of parallel lenticulated convex lenses. The first surface is constituted by a plurality of spaced apart parallel planar portions having a composite image positioned thereupon with transparent inset convex lens portions therebetween which permit the passage of light therethrough. The convex lenses and the inset convex lenses which have the same radius combine to form a combined lens of zero power of magnification. An object image, either planar or three-dimensional, is positioned beneath the sheet at a preselected distance, whereby the object image can be viewed through the transparent convex lens portions without distortion.

According to yet another aspect of the optical lens system comprises a transparent sheet having a first surface at one side of the sheet and its opposite second surface constituted by a plurality of parallel lenticulated truncated parabolic lens, the truncated surface being parallel to the plane surface. A composite image is formed of a plurality of spaced apart parallel strip portions forming intervening void portions which permit the passage of light therethrough from said planar portions. The composite image is viewable at side views through the convex (parabolic) lens portions. From the left and right views the truncated plane surfaces are blocked by the height of the lens ridges at these angles. An object is positioned at a preselected distance from said first surface, the object image being viewable in focus through the planar truncated portions when viewed straight on.

In another aspect of the invention, the parabolic lens permits the utilization of a sheet approximately $1/3$ the thickness of a standard radius lens deign with the same number of lens ridges/inch. This is essential in the utilization of commercially economical printing production, wherein the best equipment has the limitation of printing lenticular materials in the order of 100 lenticles per inch a maximum. The standard radius 100/inch lenticular would require a thickness of approximately 0.017 inch.

According to yet another aspect of the invention, the optical lens system comprises a transparent sheet having a first surface at one side of the sheet and its opposite second surface constituted by a plurality of parallel, lenticulated fresnel cylindrical lenses. Said first surface is constituted by a plurality of spaced apart parallel planer portions having a composite image positioned thereupon with intervening void portions.

According to yet another aspect of the invention, the opposite second surface of the optical lens system may be constituted by a plurality of parallel lenticulated diffractive cylindrical lenses. Said first surface is constituted by a plurality of spaced apart parallel planer portions having a composite image positioned thereupon with intervening void portions.

According to yet another aspect of the present invention, the optical system comprises a transparent sheet having a first surface at one side of the sheet and its opposite second surface constituted by a plurality of parallel lenticulated holographic optical element portions having the power of cylindrical convex lenses. Said first surface is constituted by a plurality of spaced apart parallel planar portions having a composite image positioned thereupon with intervening void portions.

According to yet another aspect of the present invention, a printed film system comprises a transparent film sheet having a first surface at one side of the film sheet, the viewing side, printed with a plurality of parallel spaced apart opaque lines, and its second surface constituted by a plurality of parallel spaced apart image lines. The parallel image lines form a composite image when viewed off angle from the verticle. An object positioned beneath and spaced at a preselected distance from said second surface, is viewable in focus when viewed from the straight on viewing position in front of the first surface.

In another aspect of the invention, the lenticular lens is used as an area of an outer package for a multi container package creating alternate views of AD graphics and individual containers within.

In another aspect of the invention, the lenticular lens packages are combined in an array to form multiple visual images.

According to an aspect of the present invention, the novel means to overcome the limitation of traditional container labels includes producing a thin printed lenticular film, and gluing on, laminating an otherwise affixing the film to the container. The lenticulation can be pre-embossed on the film, embossed during mold bottle manufacture, or embossed by label affixing machinery.

Another aspect involves an animation from an opaque pictorial view at one angle of view, to a change to a 'see-through' to the contents of the container at another angle of view, utilizing a transparent attachment material. Other aspects involve non 'see-through' animation images and 3-D images.

Another aspect of the present invention involves adjusting the print line graphics to the curved surface of many containers. To accomplish this, the image lines must be compressed in the axis perpendicular to the lines, so that the image will change as a whole as the viewer passes the container. If this adjustment were not incorporated into the production, the viewer would see only verticle bands of the image, rather than the whole image.

According to another aspect of the present invention, improved accuracy in alignment is achieved by a process in which the lenticular ridges are impressed into the film with a rotary tool, the grooves of which are perpendicular to the axis of the cylinder and have been precisely indexed after engraving each increment and each groove is identical and equidistant from the previous groove. The tool can be used in a multiple group engraving tool, or a singular engraver. In the second step of the process the film is cut at right angles to the coherent axis of the embossing cylinder and parallel to the parallel embossed ridges. The cutting is done in close proximity to the embossing or the unwind of a preembossed film roll, for greater accuracy. This cutting creates a cut parallel to the lenticular ridge pattern.

The print indicia lines are thus aligned with the lens material: The parallel line indicia must be aligned squarely with the print cylinders and edge guides. The film with its parallel lens ridges and mutually parallel edge are guided squarely into the printing presses and line up with the parallel line indicia, parallel with the film. This can be accomplished due to the mutually parallel edges.

In the case of web printing processes, the film web is guided into the press with the ridges at right angles to the cylinders. For sheet printing, the lens film first must be cut at right angles to create sheets. It is preferable to feed the sheets into the sheet presses with the lens ridges parallel to the print cylinders. Print lines are mutually parallel on the print cylinders, producing print lines on the sheets parallel to the edge and to the ridge lines.

To further achieve the desired parallel alignment, an additional step can be incorporated into the process in which embossed film is guided into the printing and laminating processes by devices producing sensory responses to the differential of parallel ridges, valleys, and edges. These devices may include optical, ultrasonic, laser and other differential sensory response devices.

According to another aspect of the process of the present invention, the printing step can be initiated first, with subsequent combining with the embossed optical ridges. First, parallel line indicia are printed on a web of film with print indicia lines parallel with the longitudinal direction of the web and with the register marks in the margins of the film. Next, the film with the parallel print lines is guided with optical sensors which read the parallel lines and/or the registration marks, in order to align the print lines straight into the apparatus which will add the parallel embossed lenticular lens grid. The embossing units have a cylinder with indexed annular grooves. Forming the embossed ridges can be accomplished by various methods. In one method, the embossing roller is warm enough to overcome the elastic memory of the film and to set the new lenticular surface into the film. Another method involves heating the film with a first warm roller or infra-red radiation or other heating methods, and while warm, embossing with a cool embossing roller which acts as a heat sink and sets in the grooves. Another method involves casting a polymer onto the embossing cylinder by exposing the polymer to UV, EB or other antic radiation as it is coated onto the film web, setting up the lenticular ridges. This can be cast onto the printed web or a second web which is laminated to the printed web.

According to another aspect of the process of the current invention, the process for producing a lenticular lens material having parallel lens to print alignment is produced by silkscreen printing lines of clear resin. The lines of resin can be printed as parallel ridges beads which naturally form a slope creating the convex lenticular bar-lens ridges. The lines of resin are delineated by minimal line spaces between the lines. However, as they are printed the lines flow slightly wider, thereby reducing the gap between the grid of adjacent resin lines such that the lens line curves nearly intersect. The silkscreen process can lay down a height of resin commensurate with lenticular ridges (as much as 0.003 in). The ridges can be set with UV and other methods. Another step in alignment involves printing parallel line indicia on the reverse side of the film web in a perfecter mode if the printing is in line, thereby assuring mutual parallel alignment of the line indicia to the silkscreened ridges. The two steps of the process can also be accomplished in reverse order. The printing may be on the same side of the film, with a flood coat of resin cured over the print first, after which the lens ridges are screen printed. The print lines may be printed by letterpress, offset, gravure, or the like, while the lens ridges are silkscreened.

According to another aspect of the process of the present invention, the process for producing a lenticular lens material having parallel lens to print alignment is produced by printing clear varnish ink repellent stripes. Said clear stripes are printed parallel to the emboss ridges on the opposite side of the film. The repellent properties of these low energy stripes make it possible to start with a continuous image on a printing plate or equivalent origination, and only have alternating lines of print adhere to the substrate, said adhering lines corresponding to the spaces between the previously printed clear varnish lines.

According to another aspect of the process of the present invention, the process for producing a lenticular lens material having parallel lens to print alignment is produced by printing thick lines of clear varnish. Said varnish lines create a differential height from the adjacent unprinted alternating stripes. Thereafter, a continuous full image on a printing plate or equivalent origination can be adjusted to transfer ink only to the raised stripes, therein leaving said alternating stripes, which are devoid of the thick varnish.

BRIEF DESCRIPTION OF THE DRAWINGS

My invention will be more clearly understood from the following description of specific embodiments of the invention, considered together with the accompanying drawings, wherein similar reference characters denote similar elements throughout the several views and in which:

FIG. 8A is a diagrammatic view showing the optical principles upon which a fourth embodiment of the present invention operates; FIG. 8B is a diagrammatic view showing the optical principals upon which a fifth embodiment of the present invention operates.

FIG. 9 is a three-dimensional view of the elements constituting the lens system shown in FIG. 8A;

FIG. 10 is a diagrammatic view showing the optical principles upon which a sixth embodiment of the present invention operates;

FIG. 11 is a three-dimensional view of the elements constituting the lens system in FIG. 10;

FIGS. 19A and 19B show perspective views of an array of multiple beverage packages;

DETAILED DESCRIPTION

Figure 1:
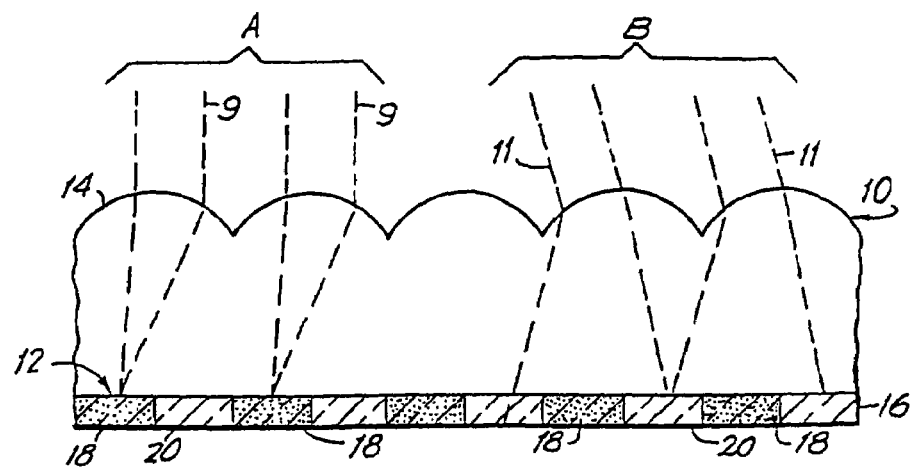
FIG. 1 is a diagrammatic view showing the optical principles on which the prior art 'opaque' devices operate.

Referring to FIG. 1, there is shown a diagrammatic view of a prior art lenticular device, which includes a lenticular screen 10 having a plane surface 12 on one side thereof. Screen 10 includes on its other side a continuous series of ridges 14 which form the lens patterns. Beneath the lenticular screen is a sheet 16 which contains two alternate series of spaced image lines 18, 20. The image lines 18 constitute a dissection of a first master picture, whereas the image lines 20 constitute the dissection of a second master picture. The two series of image lines are optically arranged so as to be alternately visible upon positional change of the viewer with respect to the screen.

By viewing the arrangement shown in FIG. 1 from position A, the lines of sight 9 are directed to the lenticular screen at any angle such that they are refracted toward the image lines 18 so that in effect a coherent and comprehensive image of the first master picture will be viewed by the viewer's eye. If the viewing position were moved to position B, then the lines of sight 11 would strike the curved faces 14 at such an angle that only the picture elements 20 are visible and a composite and comprehensive picture of the second master picture would be viewable by the viewer's eye.

Figure 2:
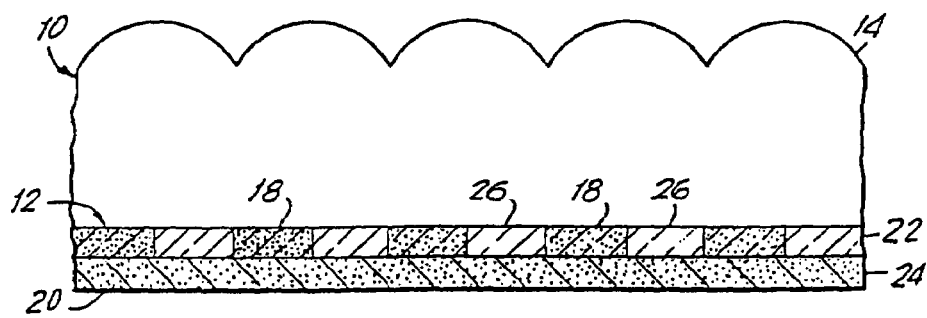
FIG. 2 is a diagrammatic view showing the optical principles of 'image-see-through' prior art utilizing conventional 'arc of circle' radius lenticles.

In the prior art device of FIG. 1, both picture elements are alternately placed in series of spaced image lines along a single sheet 16 lying in a single plane beneath the lens system. As a result, if one would want to change one of the composite pictures 18, it would be necessary to replace the entire sheet 16, which would also necessitate replacing the picture elements 20. The second image sheet 24 that contains the second composite image, as shown in FIG. 2, need not be formed into a plurality of spaced apart parallel strips as a dissection of the composite picture, but rather may include a continuum of the second composite image. An apparent image of the entire composite picture will be viewable through the transparent strips 26 located in the first image sheet 22.

Figure 3A:
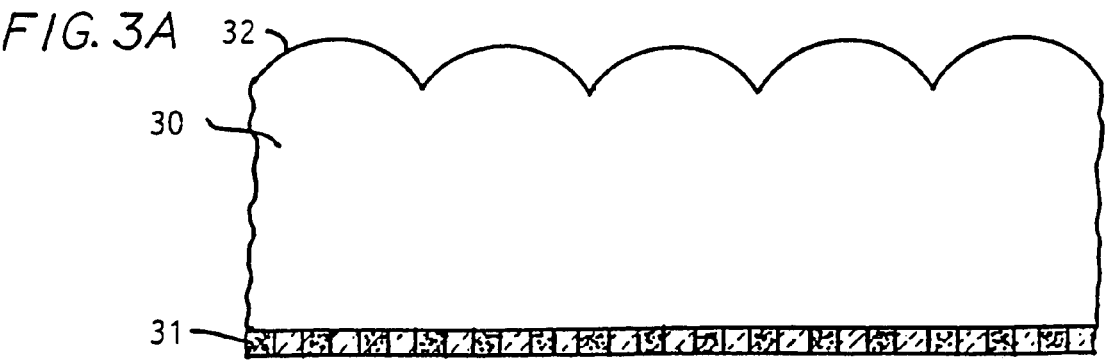
FIG. 3A illustrates another prior art system.

FIG. 3A illustrates another prior art lenticular system in which, a transparent sheet 30 includes a first surface 31, on one side of the sheet and its opposite second surface constituted by a plurality of parallel lenticular lens 32. The first surface is constituted by a plurality of image lines making up either a multi-phase animation, or multiple left-right eye views for 3 dimensional images. The transparent sheet 30, is equal in thickness to the focal length of the lens, which is approximately 3 times the radius of the lens.

Figure 3B:
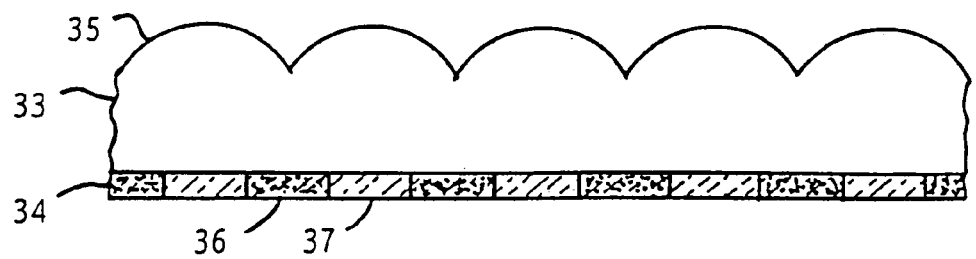
FIG. 3B is a diagrammatic view showing the optical principles upon which a first embodiment of the present invention operates.

A first embodiment of the present invention is shown in FIG. 3B.

FIG. 3B illustrates a transparent sheet 33, having a first surface 34, on one side of the sheet and its opposite second surface constituted by a plurality of parallel lenticular ridges 35. The first surface is constituted by a plurality of spaced apart parallel image strips portions 36, positioned thereupon forming a composite image. Formed between portions 36 are intervening void portions 37. The transparent sheet 33, has a thickness in the range of between the dimension of the radius, and two times the dimension of the radius.

The word "image" is used wherein and in the claims hereinbelow is defined to mean a picture, design, writing, indicia, or information, printed by a printing press or made by an artist, or writer, or made by a photographic process or by any other means. The reference herein to "voids" or "transparent strips" expressly contemplates provision of voids as well as a transparent medium.

Alternatively, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changes. Also, printed images can be viewed in conjunction with objects and/or projected images.

Figure 4:
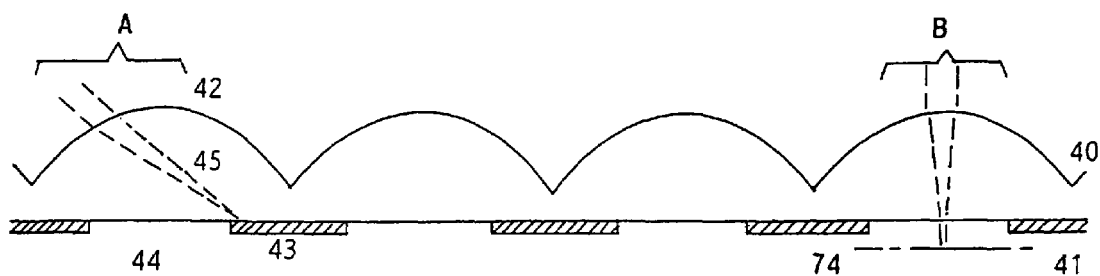
FIG. 4 is a diagrammatic view showing the optical principles upon which a second embodiment of the present invention operates.
Figure 5:
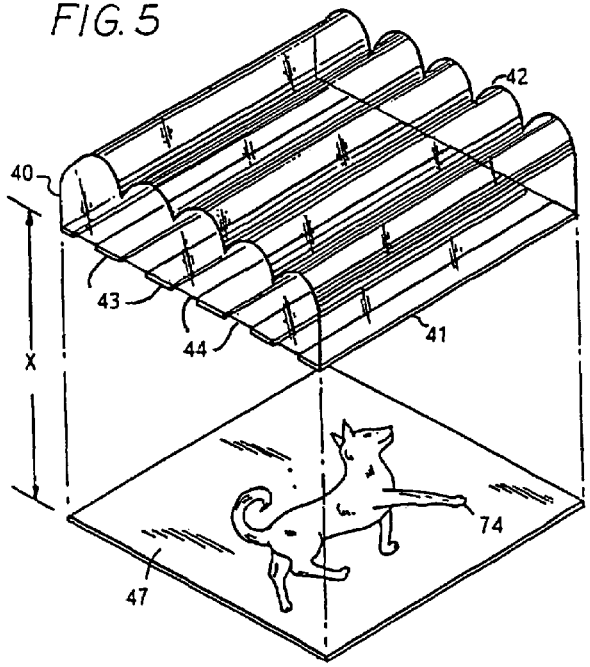
FIG. 5 is a three dimensional view of the elements constituting the lens system in FIG. 4.

An embodiment of the present invention which allows the viewer to view a composite image at one angle of sight and to view an object positioned beyond the composite image at a second angle of sight is illustrated in FIGS. 4 and 5. With reference to FIG. 4, a transparent sheet 40 includes a first surface 41 on one side of the sheet and its opposite second surface constituted by a plurality of parallel lenticular parabolic convex lenses 42. First surface 41 is constituted by a plurality of spaced apart parallel image strips 43 positioned thereupon forming a composite image. Formed between portions 43 are intervening void portions 44. As shown in FIG. 4, lines of sight 45 from viewing position A are directed to the convex lens portions 42 at such an angle that they are refracted toward parallel image strip portions 43, whereupon a viewer at position A can see the composite image; that is the picture elements 43 will form a composite and comprehensive picture of the composite image in the viewer's eye. When viewed from position B, the lines of sight 46 will reach the lens at an angle whereby they will be deflected toward the transparent strips 44 through which the viewer will be able to see an object image as an apparent entire composite and comprehensive picture. The object image needs to be in close proximity to surface 41 in order for the object image viewed to be in clear focus.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

FIG. 5 shows a three-dimensional view of the optical system of the embodiment of FIG. 4 with the transparent sheet 40, parallel parabolic convex lens 42, and first surface 41 having parallel composite image strip portions 43, and intervening void portions 44. Image 74 is shown at preselected distance $\underline{x}$ from the first surface 41, on image plane 47 which, for the purposes of exposition, is approximately parallel to first surface 41, that is, to image strip portions 43.

With reference to the embodiment of FIG. 4, it is noted that the parabolic shape of the lenses 42 permits the creation of thin film lenticulated materials wherein the same pitch or number of lenticules per inch can be formed as in much thicker prior art of circle lenticular designs. The same dimension print lines can be achieved in the present invention with the use of significantly thinner material. This is significant in that cost-effective production is significantly improved with the use of thinner materials. The use of thinner materials is directly related to the limits of commercial printing wherein the line thickness of approximately 0.005 inch registered with multiple color passes would be the finest that is efficiently printable. With the conventional radius designs, a material thickness of approximately 0.018 inch would be required. It is necessary to achieve the thinner material enabled by the present invention in order to make product available for the broad commercial areas of packaging and publishing, wherein major cost reductions, more available attachment methods for thinner materials, and overall reduction of material used are essential. This embodiment is also applicable for three-dimensional pictures.

Figure 6:
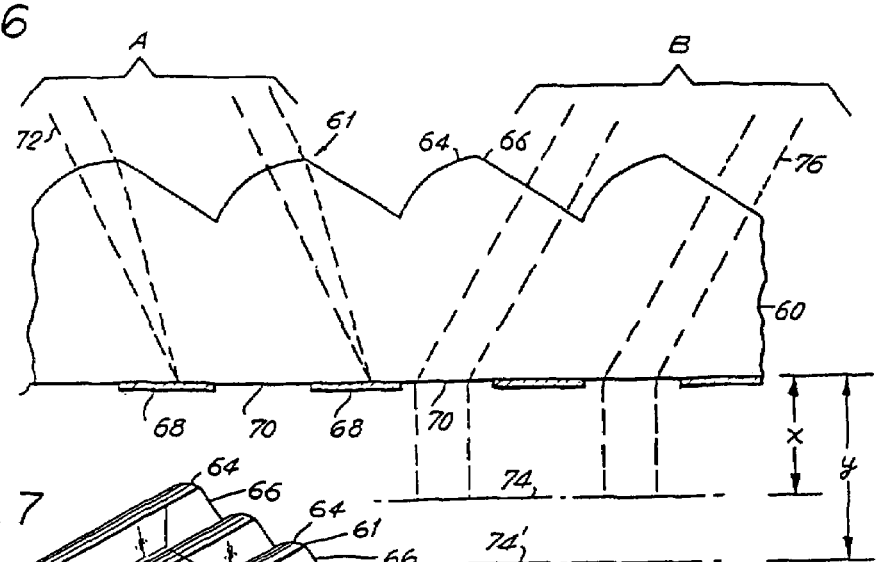
FIG. 6 is a diagrammatic view showing the optical principles upon which a third embodiment of the present invention operates.
Figure 7:
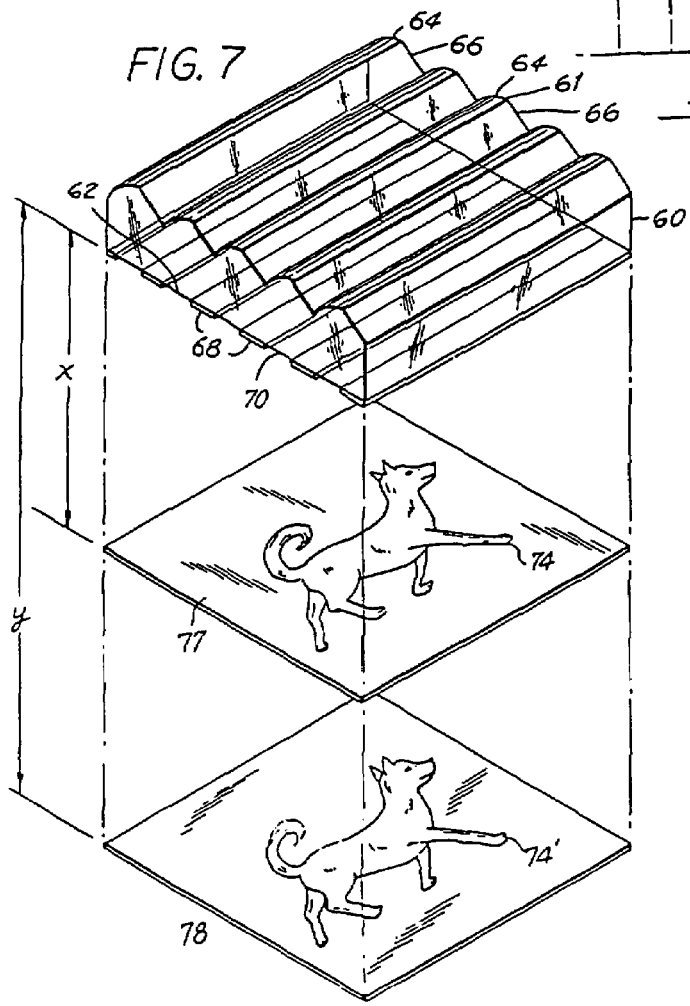
FIG. 7 is a three-dimensional view of the elements constituting the lens system in FIG. 6.

Another aspect of the present invention which allows the viewer to view a composite image at one angle of sight and to view an object positioned beyond the composite image at a second angle of sight is illustrated in the embodiment of the invention shown in FIGS. 6 and 7.

In the diagrammatic view of the invention at FIG. 6, images are viewed through a transparent lenticular-type screen, or sheet, 60 having a plane surface 62 at one side of the sheet and its opposite surface constituted by a plurality of lenticular-type parallel ridges 61. Each ridge includes a convex lens portion 64 and a planar portion 66, the portions 64 and 66 being parallel to one another. Planar portions 66 are at a preselected angle with respect to plane surface 62 for a purpose described below.

A composite image is positioned on surface 62 of sheet 60, the image being formed of a plurality of spaced apart parallel image strip portions 68. Formed between portions 68 are intervening void portions 70. As shown on FIG. 6, lines of sight 72 from viewing portion A are directed to the convex lens portions 64 at such an angle that they are refracted toward parallel image strip portions 68, whereupon a viewer at position A can see the composite image. That is, the picture elements 68 form a composite and comprehensive picture of the composite image in the viewer's eye.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

Referring to FIG. 6, an image, which may be a three-dimensional object or a substantially flat image, referred to here as an object image 74, is positioned directly beneath and at a preselected distance from plane surface 62. The preselected angle at which planar lens portion 66 is disposed causes the light rays of line of sight 76 from viewing position B to strike plane surface 62 and to refract preferably perpendicular, or normal to surface 62 and to enter sheet 60 directly without refraction and so to continue directly to void portion 70 at which plane it is refracted at an angle that directs the light rays directly downwards to object image 74. Thus the viewer can, by selecting either viewing position A or B alternately view the composite image or image strip portions 68 or the object image 74. Object image 74 can, as noted above, be three-dimensional or two-dimensional. In addition, it can be disposed at any of a plurality of preselected distances, shown, for purposes of exposition, at distance X and at distance Y from surface 62, labeled images 74 and 74' respectively on image planes 77 and 78. In order that the viewer be able to see image 74, planar surface 66 must be disposed at such an angle to surface 62 that the light rays exit from void portions 70 normal to the surface of portions 70.

FIG. 7 illustrates a three-dimensional view of the optical system showing transparent sheet 60 with parallel planar portions 66 and convex lens portions 64 or parallel ridges 61 and parallel image strip portions 68 and intervening void portions 70 with object images 74 and 74' disposed at preselected distances x and y from plane surface 62. Object 74 is shown disposed on a plane 77 and object 74' is shown on a plane 78 for purposes of exposition.

With reference to the embodiment of FIG. 6 it is noted that since there is no lens or curvature involved at either planar portions 66 or plane surface 62 at void portions 70, there will be no distortion of the image and the image will, in addition, be in focus. Because of the present effect, however, object 74 will appear to the viewer at position B to be at a different location than in fact it is; that is, there will be a shift in the object's apparent position.

Another aspect of the present invention which allows the viewer to view a composite image at one angle of sight and to view an object positioned beyond the composite image at a second angle of sight is illustrated in the embodiment of the invention shown in FIGS. 8 and 9.

With reference to the embodiment illustrated in FIG. 8A, a transparent sheet 80 includes a first surface 82 on one side and its opposite second surface is constituted by a plurality of parallel lenticulated convex lenses 84. First surface 82 is constituted by a plurality of spaced apart parallel planar portions 86 having parallel composite image strip portions 88 positioned thereupon forming a composite image. Transparent concave lens portions 89 are disposed between the parallel image portions 88. Light from the convex lenses 84 can pass through concave lenses portions 89. Convex lenses 84 and concave lens portions 89 together combine to form a single combined lens of zero power.

As shown in FIG. 8A, lines of sight 90 are directed to convex lens portions 84 at such an angle that they are refracted toward parallel image strip portions 88, whereupon a viewer at position A can see the composite image, that is, picture elements 88 will form a composite and comprehensive picture of the composite image in the viewer's eye.

Referring to FIG. 8A, either a three-dimensional or substantially flat image, referred to here as object image 74, is positioned directly beneath and at a preselected distance from first surface 82. When the viewer is positioned at viewing position B, lines of sight 91 are directed at convex lenses 84 which are then refracted toward transparent concave lens portions 89 from where they exit at a refracted angle to continue to object 74. Thus, object 74 can be viewed from position B without distortion. Object 74 can be disposed at a plurality of preselected positions beneath surface 82, and, for purposes of exposition, object 74 is shown at an x distance and also at a y distance, where it is characterized as 74'.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

FIG. 9 shows a three-dimensional view of the optical system of the embodiment of FIG. 8A that includes a transparent sheet 80, parallel convex lenses 84, and first surface 82 having parallel planar portions 86 with composite image strip portions 88 and intervening concave lens portions 90. Image 74 is shown at preselected distance x from first surface 82 and image 74' at preselected distance y on image planes 92 and 93, respectively, each plane being, for purposes of exposition, approximately parallel to first surface 82, that is, to image strip portions 88.

In the embodiment of FIG. 9, the structure of surface 82 with indented concave lens portions 89, and protruding alternating strip portions 88 makes it possible for an inking system to transfer ink to strip portions 88, automatically registering the ink to these raised strips and not transferring ink to the indented concave lens portions 89, thereby to produce the required result of registered parallel print lines and alternating unprinted spaces from a standard continuous image on the print plate. The surface 82 thus registers the ink in the necessary line strips.

Another aspect of the present invention which allows the viewer to view a composite image at one angle of sight and to view an object positioned beyond the composite image at a second angle of sight is illustrated in the embodiment of the invention shown in FIG. 8B.

With reference to the embodiment illustrated in FIG. 8B, a transparent sheet 94 includes a first surface 95 on one side and its opposite second surface is constituted by a plurality of parallel lenticulated convex lenses 96. First surface 95 is constituted by a plurality of spaced apart parallel planar portions 97 having parallel composite image strip portions 98 positioned thereupon forming a composite image. Transparent inset convex lens portions 99 are disposed between the parallel image portions 98. Convex lenses 96 and 99, both have the same radius of curvature. Light from the convex lenses 96 can pass through convex lenses portions 98. Convex lenses 96 and convex lens portions 99 together combine to form a single combined lens of zero power.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

Yet another aspect of the present invention which allows the viewer to view a composite image at one angle of sight and to view an object positioned beyond the composite image at a second angle of sight is illustrated in the embodiments of FIGS. 10 and 11.

With reference to FIG. 10, a transparent sheet 100 is illustrated having a first surface 102 on one side of the sheet and its opposite second surface is constituted by a plurality of parallel lenticular truncated parabolic convex ridges 101. Each ridge includes a convex lens portion 104 and a planar portion 106, the portions 104 and 106 being parallel to one another. First surface 102 is constituted by a plurality of spaced apart parallel image strips 108 positioned thereupon forming a composite image. Formed between portions 108 are intervening void portions 110. As shown in FIG. 10, lines of sight 112 from viewing position A are directed to the convex lens portions 104 at such an angle that they are refracted toward parallel image strip portions 108, whereupon a viewer at position A can see the composite image. That is, the picture elements 108 will form a composite and comprehensive picture of the composite image in the viewer's eye. When viewed from position B, the lines of sight 114 will reach the lens at an angle whereby they will be deflected toward the transparent strips 110 through which the viewer will be able to see an object image 74 as an apparent entire composite and comprehensive picture.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

FIG. 11 shows a three-dimensional view of the optical system of the embodiment of FIG. 10 described with the transparent sheet 100, parallel truncated parabolic convex lenses 101, and first surface 102 having parallel composite image strip portions 108, and intervening void portions 110. Image 74 is shown at preselected distance x from first surface 102, on image plane 116, and image 74' is shown at preselected distance y on image plane 118, each plane being, for the purposes of exposition, approximately parallel to first surface 102, that is, to image strip portions 108.

Referring to FIG. 11, an image, which may be a three-dimensional object or a substantially flat image, referred to here as an object image 74, is positioned directly beneath and at a preselected distance from plane surface 102. Truncated planar portion 106 is parallel to the plane surface 102, whereby the light rays of line of sight 114 from viewing position B enter sheet 100 directly without refraction and so continue directly through void portion 110 and on directly downward to object image 74. Thus the viewer can, by selecting either viewing position A or B, alternately view the composite image of image strip portions 108 or the object 74. In addition, it can be disposed at any of a plurality of preselected distance, shown, for purposes of exposition, at distance x and at distance y from surface 102, labeled 74 and 74' respectively. Since there is no lens curvature involved at either planar portions 106 or plane surface 102 at void portions 110, there will be no distortion of the image and the image will, in addition, be in focus.

With reference to the embodiment of FIG. 10, the parabolic shape of the lenses 104 permit the creation of thin film lenticulated materials wherein the same pitch or number of lenticules per inch can be formed as in much thicker designs using an arc of circle radius. The same dimension print lines can thus be achieved which significantly improves cost effective production.

Figure 12:
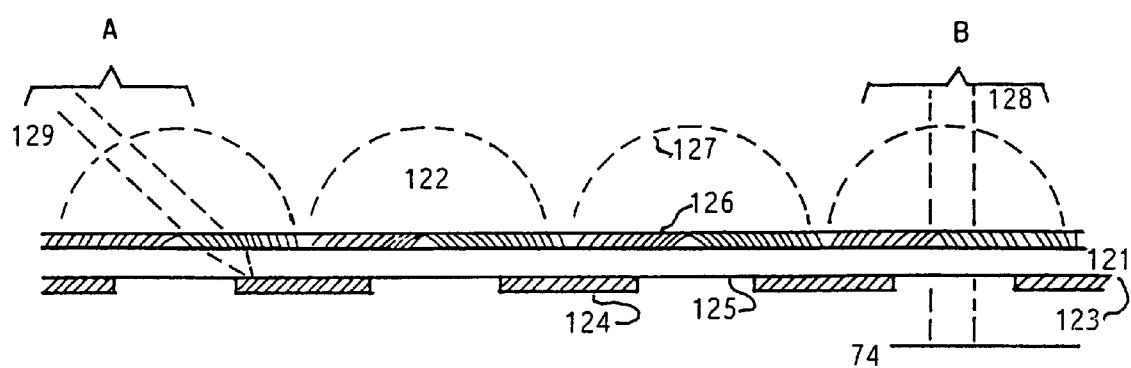
FIG. 12 is a diagrammatic view showing the optical principles upon which a seventh embodiment of the present invention operates.

Yet another aspect of the present invention which allows the viewer to view a composite image at one angle of sight and view an object positioned beyond the composite image at a second angle of sight is illustrated in FIG. 12.

With reference to FIG. 12, a transparent sheet 121 is illustrated having a first surface 123 on one side of the sheet and its opposite second surface constituted by a plurality of parallel holographic optical element portions, 122, having the power of convex cylindrical lenses, 127, the portions 122 being parallel to one another with brag planes 126. First surface 123 is constituted by a plurality of spaced apart parallel image strips 124 positioned thereupon forming a composite image. Formed between portions are intervening void portions 125. As shown in FIG. 12, lines of sight 129 form viewing position A are directed to the holographic optical element lens portions 122 at such an angle that they are directed towards parallel image strip portions 124, whereupon a viewer at position A can see the composite image; that is the picture elements 124 will form a composite and comprehensive picture of the composite image in the viewer's eye. When viewed from position B, the lines of sight 128 will reach the lens at an angle whereby they will be deflected towards the transparent strips 125 through which the viewer will be able to see an object 74 as an apparent entire composite and comprehensive picture.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

In the embodiment of FIG. 12, the holographic optical element type of lenses permits the creation of thin film lenticulated materials wherein the same pitch or number of lenticles per inch can be formed as in much thicker designs using conventional lenses. As in previously described embodiment, the same dimension print lines can be achieved on significantly thinner material.

In addition, the system can be used to view opaque animating images or left-right eye view three-dimensional pictures by substituting printed indicia in the place of the intervening void portions 125 on plane 123.

Figure 13:
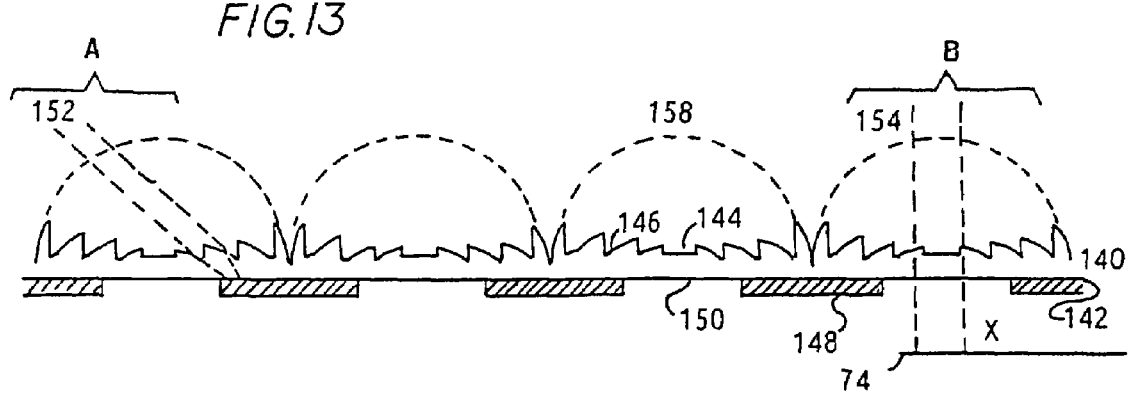
FIG. 13 is a diagrammatic view showing the optical principles upon which a eighth embodiment of the present invention operates.
Figure 14:
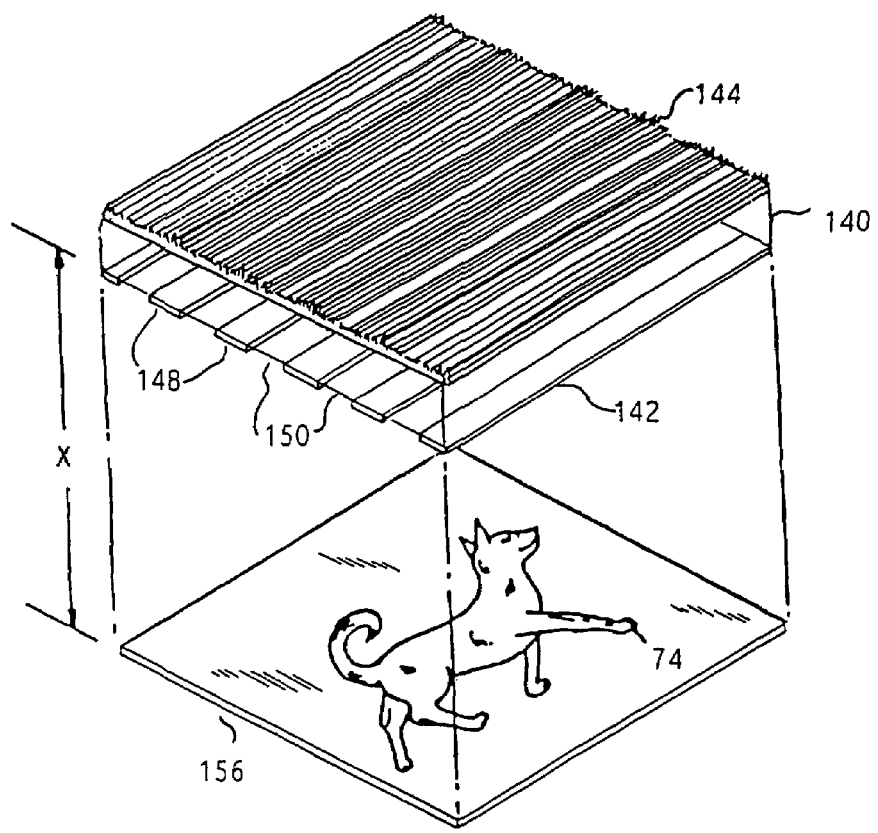
FIG. 14 is a three-dimensional view of the elements constituting the lens system shown in FIG. 13.

Yet another aspect of the present invention which allows the viewer to view a composite image at one angle of sight and to view an object positioned beyond the composite image at a second angle of sight is illustrated in the embodiments of FIGS. 13 and 14.

With reference to FIG. 13, a transparent sheet 140 includes a first surface 142 on one side and its opposite second surface is constituted by a plurality of parallel lenticulated cylindrical fresnel convex lenses 144. Each ridge is composed of a symmetrical groove facets 146 which are parallel to one another. First surface 142 is constituted by a plurality of spaced apart parallel image strips 148 positioned thereupon forming a composite image. Intervening void portions 150 are formed between portions 148. As shown in FIG. 12, lines of sight 152 from viewing position A are directed to the fresnel convex lens portions 144 at such an angle that they are refracted toward parallel image strip portions 148, whereupon a viewer at position A can see the composite image; that is the picture elements 148 will form a composite and comprehensive picture of the composite image in the viewer's eye. When viewed from position B, the lines of sight 154 will reach the lens at an angle whereby they will be deflected toward the transparent strips 150 through which the viewer will be able to see an object image 74 as an apparent entire composite and comprehensive picture.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

FIG. 14 is a three-dimensional view of the optical system of the embodiment described with the transparent sheet 140, parallel lenticulated fresnel cylindrical convex lenses 144, and first surface 142 having parallel composite image strip portions 148, and intervening void portions 150. Image 74 is shown at preselected distance x from first surface 142, on image plane 156. This plane is, for purposes of exposition, shown approximately parallel to first surface 142, that is, to image strip portions 148.

Referring to FIG. 14, an image, which may be a three-dimensional object or a substantially flat image, referred to here as an object image 74, is positioned directly beneath and at a preselected distance from plane surface 142. The viewer can, by selecting either viewing position A or B, alternately view the composite image of image strip portions 148 or the object 74.

With reference to the embodiment of FIG. 13, it is noted that the fresnel type of lenses 144 permits the creation of thin film lenticulated materials wherein the same pitch or number of lenticules per inch can be formed as in much thicker designs using conventional convex lenses 158, so that the same dimension print lines can be achieved with significantly thinner material.

In addition, the system can be used to view opaque animating images of left-right eye view three-dimensional pictures by substituting printed indicia in the place of the intervening void portions 150, on plane 142.

Figure 15:
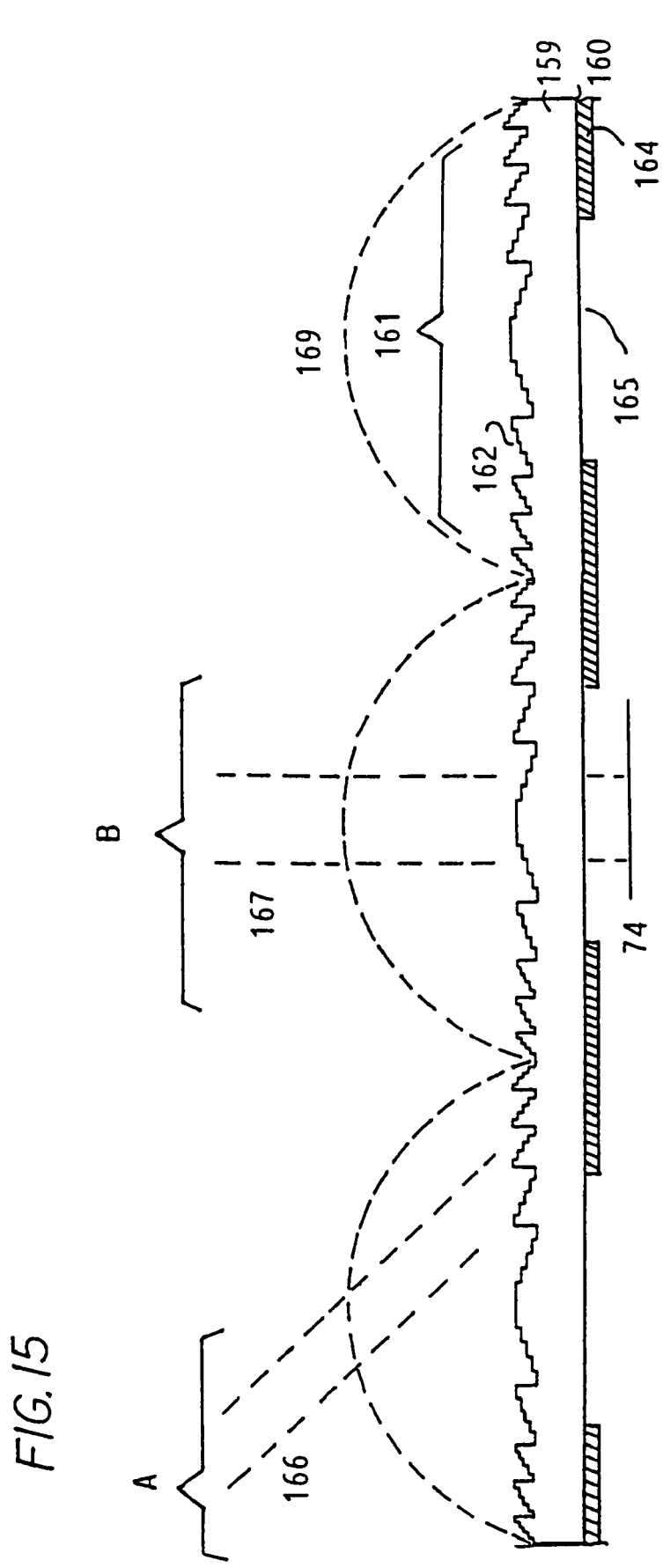
FIG. 15 is a diagrammatic view showing the optical principles upon which a ninth embodiment of the present invention operates.

Yet another aspect of the present invention which allows the viewer to view a composite image at one angle of sight and to view an object positioned beyond the composite image at a second angle of sight is illustrated in the embodiment of FIG. 15.

With reference to the embodiment of FIG. 15, a transparent sheet 159 includes a first surface 160 on one side and its opposite second surface is constituted by a plurality of parallel diffractive lenses 161 having the power of convex cylindrical lenses. Each lens is composed of symmetrical step facets 162 the portions being parallel to one another. First surface 160 is constituted by a plurality of spaced apart parallel image strips 164 or portions positioned thereupon forming a composite image. Intervening void portions 165 are formed between these portions. As shown in FIG. 15, lines of sight 166 viewing position A are directed to the diffractive lens portions 161 at such an angle that they are diffracted toward parallel image strip portions 164, whereupon a viewer at position A can see the composite image; that is, the picture elements or image portions 164 will form a composite and comprehensive picture of the composite image in the viewer's eye. When viewed from position B, the lines of sight 167 will reach the lens at an angle whereby they will be deflected toward the transparent strips 163 through which the viewer will be able to see an object 74 as an apparent entire composite and comprehensive picture.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this lenticular lens system. For example, one image or object can be held in a static viewing position in a viewing device, while other images or objects are changed. Also, printed images can be viewed in conjunction with objects and/or projected images.

In addition, the system can be used to view opaque animating images or left-right eye view three-dimensional pictures by substituting printed indicia in the place of the intervening void portions 165, on plane 160.

In the embodiment of FIG. 15, the diffractive type of lenses permits the creation of thin film lenticulated materials wherein the same pitch or number of lenticles per inch can be formed as in much thicker designs using conventional lenses. As in previously described embodiments, the same dimension print lines can be achieved on significantly thinner material.

Figure 16:
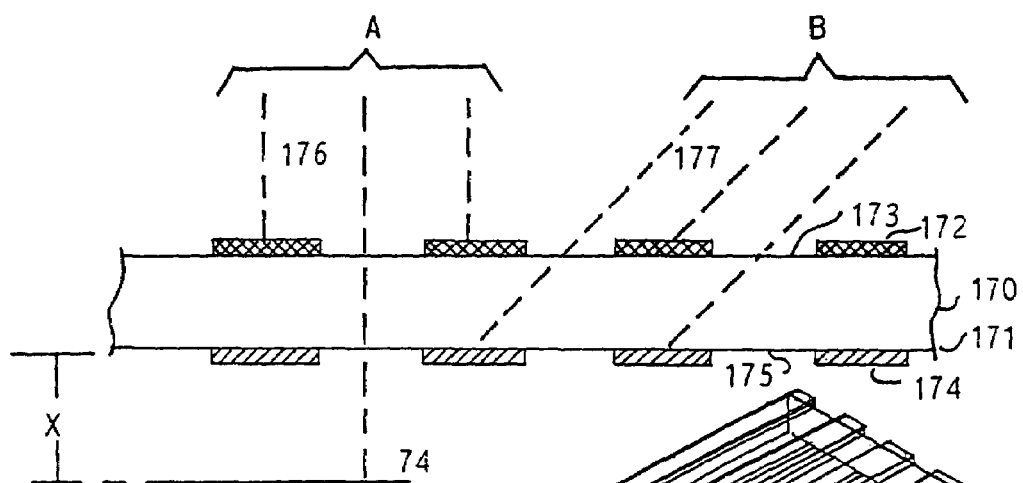
FIG. 16 is a diagrammatic view showing the optical principles upon which a tenth embodiment of the present invention operates.
Figure 17:
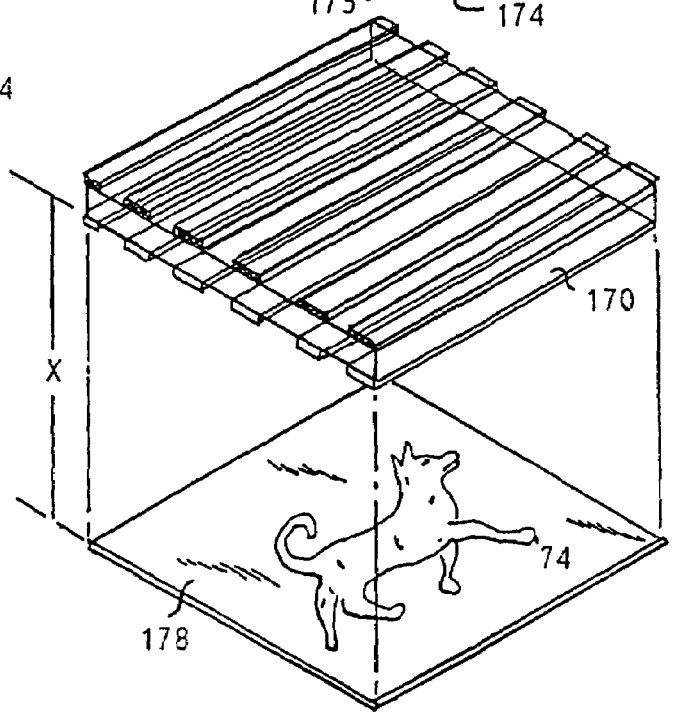
FIG. 17 is a three-dimensional view of the elements constituting the lens system in FIG. 16.

Yet another embodiment of the present invention which allows the viewer to view a composite image at one angle of sight and to view an object positioned beyond the composite image at a second angle of sight is illustrated in FIGS. 16 and 17.

With reference to FIG. 16, a transparent sheet 170 includes a first surface 171 on one side and its opposite second surface constituted by a plurality of parallel spaced apart solid opaque lines 172. Formed between portions 172 are intervening void portions 173. First surface is constituted by a plurality of spaced apart parallel image strips 174 positioned thereupon and positioned directly opposite in the verticle plane from the solid lines on the second surface. These image strips form a composite image. Formed between portions 174 are intervening void portions 175. As shown in FIG. 16, lines of sight 176 from viewing position A are directed at a 90° angle to transparent sheet 170 and through intervening void portions 173 and intervening void portions 175, whereupon a viewer at position A can see the composite view of object image 74 as an apparent entire composite and comprehensive picture. When viewed from position B, the lines of sight 177 are directed through the intervening void portions 173 toward parallel image strip portions 174, whereupon a viewer at position B can see the composite image; that is, the picture elements 174 will form a composite and comprehensive picture of the composite image in the viewer's eye.

Alternately, the image strip portions can be printed on removable screens containing the respective composite images, projected on said first surface, or removed entirely. This flexibility enables the alternate viewing of changeable indicia. This can enhance the capability of visual displays and viewing systems. The viewer can therein compare, juxtapose, and interpolate various images and objects by viewing them through this system. For example, one image or object can be held in a static viewing position in a viewing device, while other images or objects are changed. Also, printed images can be viewed in conjunction with objects and/or projected images.

FIG. 17 shows a three-dimensional view of the optical system of the embodiment described with the transparent sheet 170, parallel solid opaque lines 172 and intervening void portions and first surface 171 having parallel composite image strip portions 174, and intervening void portions. Image 175 is shown at preselected distance $x$ from first surface 171, on image plane 178. This plane is, for purposes of exposition, shown approximately parallel to first surface 171, that is, to image strip portions.

Referring to FIG. 17, an image, which may be a three-dimensional object or a substantially flat image, referred to here as an object image 74, is positioned directly beneath and at a preselected distance from plane surface 171. The viewer can by selecting either viewing position A or B alternately view the composite image of image strip portions 174 or the object 74.

Figure 18B:
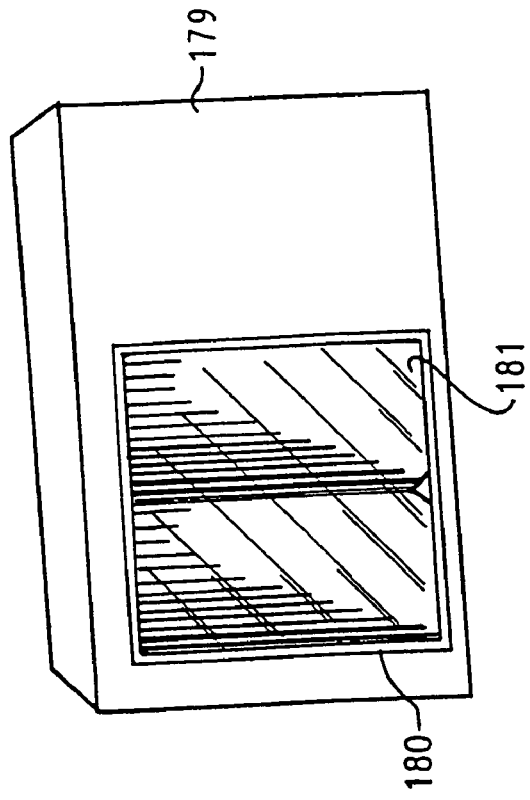
FIGS. 18A and 18B show perspective views of a multi-beverage package having an area of lenticular lens.
Figure 18A:
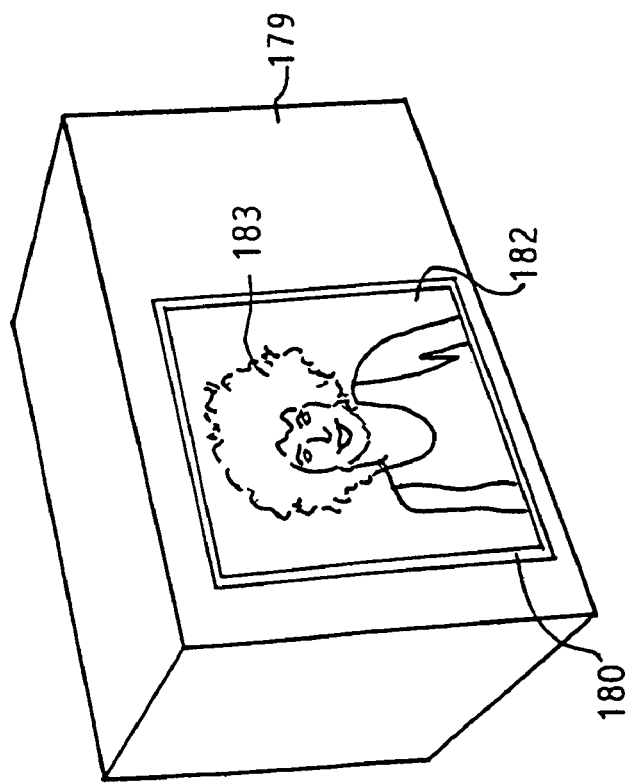

In the embodiment of FIG. 18, a multi-container package is shown which includes a back, two sides, top, and bottom solid walls, and a front wall 179, with a window opening 180 and individual containers inside. The window contains a transparent sheet 182 having an outer surface constituted by a plurality of lenticular lenses, whereby when viewed in a first position, a picture 183 is seen as shown in FIG. 18A. When viewed from a slightly different angle, the containers 181 inside the package are seen, as shown in FIG. 18B. The window area shown is an exemplary package; other packages can be formed with lesser or greater areas of lenticular sheet, even the entire package.

FIG. 19 illustrates an array of multi-container packages 184 with lenticular window areas 185, which, when viewed in a first position provide a multiple composite view of pictures as seen in FIG. 19A. When viewed from a slightly different angle, the containers inside the package are seen, as shown in FIG. 19B. The pictures can be multiple images of the same picture, or different images, or partial views of one picture. These window areas shown are exemplary packages; other packages can be formed with lesser or greater areas of lenticular sheet, even the entire packages.

Figure 20A:
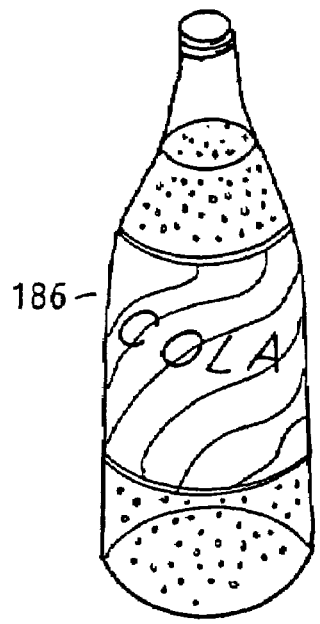
FIG. 20A shows a three-dimensional view of a container with a lenticular area.
Figure 20B:
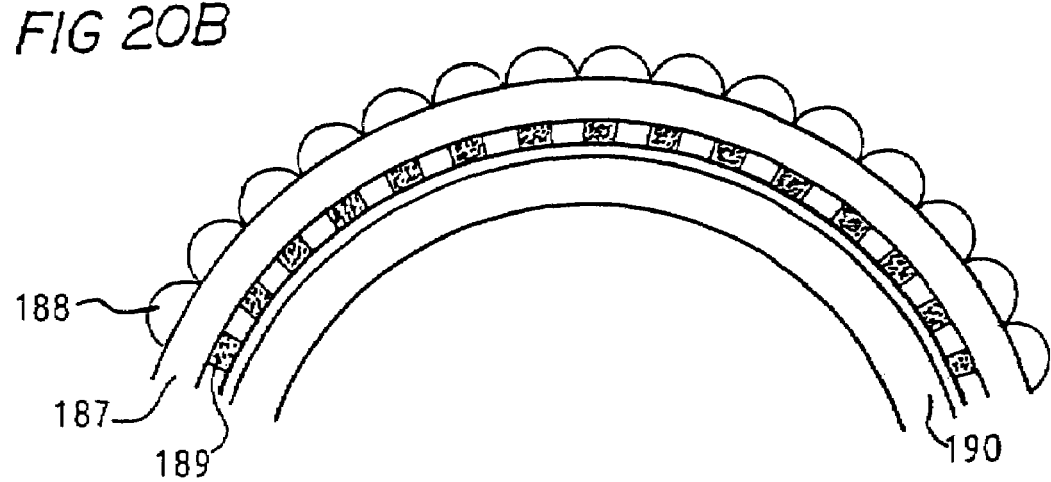
FIG. 20B shows a cross-section of container wall with lenticular area.

Another embodiment of the present invention, which allows the viewer to see alternating and three-dimensional formation on containers, is illustrated in FIG. 20. FIG. 20A illustrates a container which includes a lenticular area 186, on the container surface. As shown in the cross section in FIG. 20B, the area consists of a transparent sheet 187, constituted by a plurality of lenticular lenses 181 on its outer surface with parallel print line indicia 189 on the side opposite the lens ridges 188, the side of the film facing into the container 190. In printing the parallel image indicia 189 on a curved surface, the lines must be compressed in the axis perpendicular to the lines, compared to the original line grid designed to be printed on a lenticular film which would remain flat. The image will change as a whole as the viewer passes the container, rather than 'banding' of the image. Conversely, by printing vertical color lines in a configuration for a flat planer surface alignment and then mounting these on a curved clear container the print lines will create a visual illusionary effect of bending into the bottle.

Figure 21:
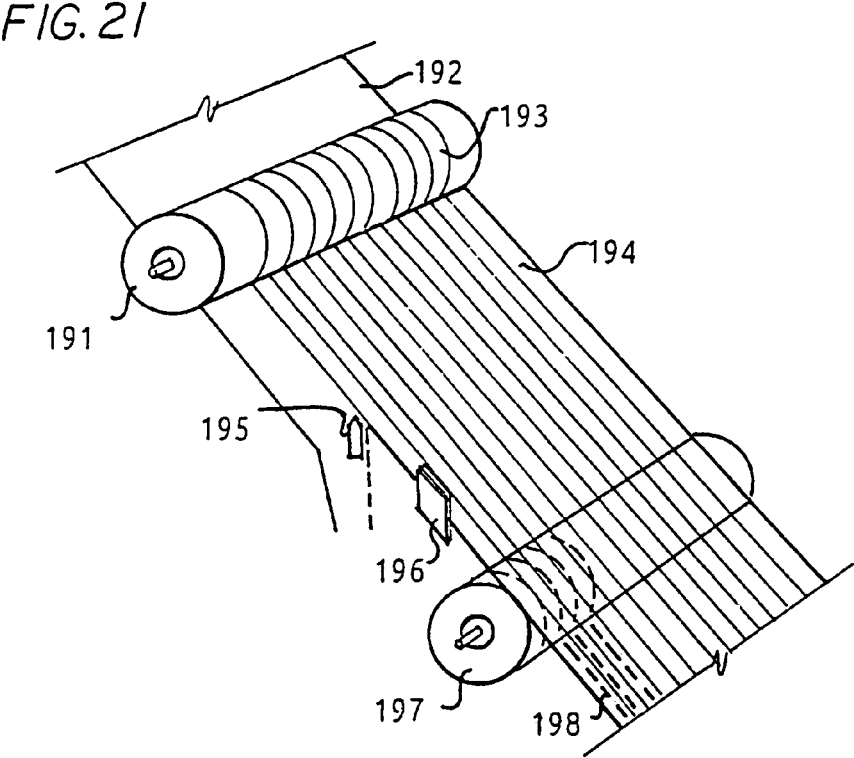
FIG. 21 is a three-dimensional view showing a process in accordance with one embodiment of the present invention.
Figure 22:
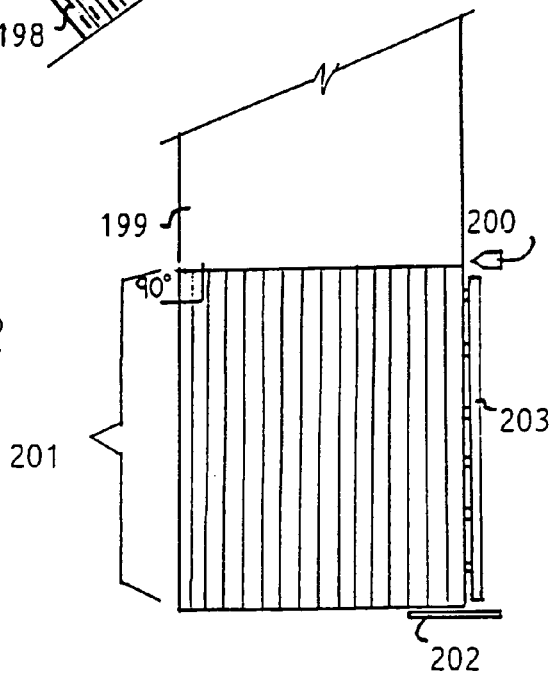
FIG. 22 is a diagrammatic view showing a process for creating an enclosed lenticular film in accordance with the process of the present invention.

FIG. 21 illustrates a method for creating embossed lenticular film with parallel alignment. The annular cylinder 191 with its indexed grooves 193 embosses or casts lenticular ridges 194 onto the film 192, each ridge being at right angles to the axis of the embossing cylinder 191. Next, a cutting device such as a knife mechanism 195 is set to cut the embossed film at right angles to the axis of the embossing cylinder and in critical parallel alignment to the embossed ridges on the film, 192. A mechanical edge guide or sensory edge guiding device 196 positions the embossed film to feed the film into printing presses squarely. A sensory device could be connected with servo motors to make necessary corrections to keep the film in a straight path alignment. Print cylinders 197 are set squarely with the edge guidance to assure parallel register of the subsequent print lines 198 to the parallel emboss of the film. As shown in FIG. 22, the web 199 is cut at right angles with a knife or other cutting device 200 forming sheets 201. The sheets are aligned into the press by edge guide 202 and gripper bar 203.

Figure 23:
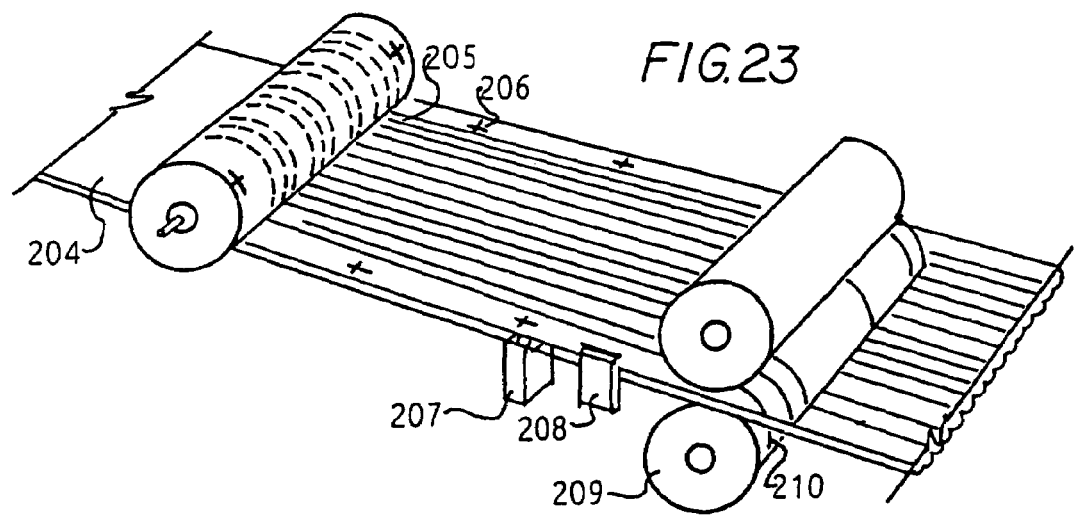
FIG. 23 is a three-dimensional view showing a process of the present invention.

FIG. 23 illustrates the method for creating embossed lenticular film with parallel print alignment. The film web 204 is first printed with parallel line indicia 205 and with registration marks 206. Optical (or other sensory devices) 207 read the parallel line pattern 205 and/or the registration marks 206 guide the print lines straight into the embosser with its edge guide 208 and embossing cylinder 209 with its annular parallel grooves 210, thereby producing parallel embossed lenticular ridges which are mutually parallel to the print line indicia.

Figure 24:
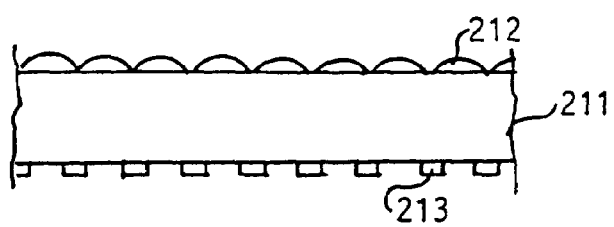
FIGS. 24 and 25 are diagrammatic cross-sectional views showing a process in accordance with the present invention.

FIG. 24 illustrates a method for creating lenticular film with parallel print alignment. The film web 211 is first printed with parallel lines of clear resin 212. The resin forms curved ridges. Parallel line indicia 213 are printed on the reverse side of the film in a perfecter printing mode to produce print lines which are parallel to the printed resin lenticular ridges on the other side of the film.

Figure 25:
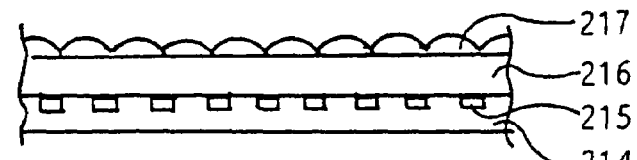

FIG. 25 illustrates the method for creating lenticular film with parallel print alignment. As therein shown, the film web 214 is first printed with parallel line indicia 215. A flood coat 216 is spread over the printed surface and cured. Parallel lines of clear resin 217 are printed on top of the flood coat layer 216 in parallel register with the print lines below.

Figure 26:
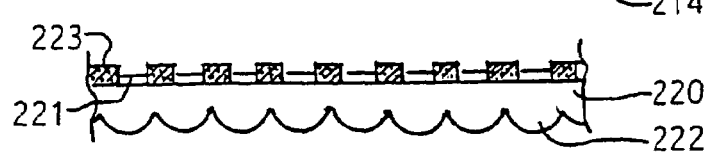
FIG. 26 is a diagrammatic cross-sectional view showing a process of the present invention.

FIG. 26 illustrates a method for creating lenticular film with parallel print alignment. The lenticular film 220 is first printed with parallel lines of clear varnish 221, mutually parallel to lenticular ridges 222 on the reverse side of the film 220. The varnish lines 221 have repellent properties wherein subsequent print image adheres only to the adjacent alternating unvarnished stripes 223.

Figure 27:
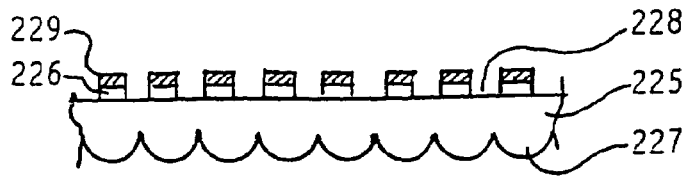
FIG. 27 is a diagrammatic cross-sectional view showing process of the present invention.

FIG. 27 illustrates a method for creating a lenticular film with parallel print alignment. The lenticular film 225 is first printed with thick parallel lines of varnish 226 by silkscreen or other methods mutually parallel to the lens ridges 227 on the reverse side of the film. The varnish lines 226 form raised planar portions, with adjacent intervening stripes 228 which are devoid of the varnish. When printed, the lines of varnish 226 register ink 229 to themselves and prevent transfer of ink to alternating stripes 228.

The embodiments of the invention particularly disclosed and described herein are presented merely as examples of the invention. Other embodiments, forms and modifications of the invention coming within the proper scope and spirit of the appended claims will, of course, readily suggest themselves to those skilled in the art.

The invention claimed is:

1. A container having a lenticular area of the container surface said area having an outer surface constituted by a plurality of lenticular lenses, said lenticular lenses formed onto the outer surface, whereby said lenses are integrally formed in the outer surface of a singular material, the lenses being molded into the surface itself, by a process selected from the group consisting of pre-embossing the lenticular area, pre-extruding the lenticular area, cast embossing by an engraved portion of a mold while simultaneously forming the container, and embossing with an embossing plate within a label-affixing machine, said lenticular area having a composite image formed by a plurality of parallel image lines facing into the container, said lenticular lens areas on containers selected from the group consisting of flat-faced and curved containers in which the graphics on the curved containers are selected from the group of a complete image wherein the print image lines are compressed to provide a complete image which matches the optics of the pitch of the lenticular lens grid in its curved orientation and the non compressed print alignment to produced visual illusionary effects of image lines going into a clear container.

2. A process for producing a container having a lenticular area comprising the steps:

A. forming clear parallel ridges on the viewing side of a transparent material, whereby the lenses are molded into the surface itself, by a process selected from the group consisting of embossing, casting, and extruding, B. creating mutually parallel print lines opposite from and in alignment with said ridges by a step selected from the group consisting of printing in line and off line, C. forming said lenticular area as an area of the container.

3. A machine for carrying out the process of claim 2.

* * * * *